United States Patent
Freund, Jr. et al.

(10) Patent No.: US 7,152,490 B1
(45) Date of Patent: Dec. 26, 2006

(54) METHODS FOR DETERMINING TRANSDUCER DELAY TIME AND TRANSDUCER SEPARATION IN ULTRASONIC FLOW METERS

(75) Inventors: William R. Freund, Jr., Houston, TX (US); Klaus J. Zanker, Houston, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 0 days.

(21) Appl. No.: 11/204,068

(22) Filed: Aug. 15, 2005

(51) Int. Cl.
   *G01F 1/66* (2006.01)
(52) U.S. Cl. .................................................. 73/861.27
(58) Field of Classification Search ............. 73/861.29, 73/861.27, 861.18, 861.19, 861.25, 861.26
   See application file for complete search history.

(56) References Cited

U.S. PATENT DOCUMENTS

| | | | |
|---|---|---|---|
| 4,004,461 A * | 1/1977 | Lynnworth ............... | 73/861.27 |
| 5,383,369 A | 1/1995 | Khuri-Yakub et al. | |
| 5,386,830 A | 2/1995 | Powers et al. | |
| 5,406,854 A | 4/1995 | Wagner | |
| 5,415,048 A | 5/1995 | Diatschenko et al. | |
| 5,421,211 A | 6/1995 | Heckman | |
| 5,433,117 A | 7/1995 | Taphorn et al. | |
| 5,458,004 A | 10/1995 | van der Pol | |
| 5,460,047 A | 10/1995 | Jacobson | |
| 5,461,931 A | 10/1995 | Gill | |
| 5,463,905 A | 11/1995 | Baird | |
| 5,493,916 A | 2/1996 | Bignell | |
| 5,526,699 A | 6/1996 | Dorr | |
| 5,540,230 A | 7/1996 | Vilkomerson | |
| 5,546,813 A | 8/1996 | Hastings et al. | |
| 5,553,505 A | 9/1996 | Bignell et al. | |
| 5,583,301 A | 12/1996 | Strauss et al. | |
| 5,597,962 A | 1/1997 | Hastings et al. | |
| 5,602,343 A | 2/1997 | Franklin | |
| 5,639,971 A | 6/1997 | Brown | |
| 5,639,972 A | 6/1997 | Hastings et al. | |
| 5,644,090 A | 7/1997 | Spendel | |
| 5,645,071 A | 7/1997 | Harnoncourt et al. | |
| 5,650,571 A | 7/1997 | Freud et al. | |
| 5,650,572 A | 7/1997 | Vontz | |
| 5,652,396 A | 7/1997 | Gill | |
| 5,668,326 A | 9/1997 | Brown | |
| 5,705,753 A | 1/1998 | Hastings et al. | |
| 5,710,379 A | 1/1998 | Brown | |
| 5,719,329 A | 2/1998 | Jepson et al. | |
| 5,728,948 A | 3/1998 | Bignell et al. | |
| 5,729,180 A | 3/1998 | Brown | |

(Continued)

OTHER PUBLICATIONS

Lunde, et al., "Challenges for Improved Accuracy and Traceability in Ultrasonic Fiscal Flow Metering", 18th North Sea Flow Measurement Workshop, 2000, 17 pp.

(Continued)

*Primary Examiner*—Jewel Thompson
(74) *Attorney, Agent, or Firm*—Mark E. Scott; Conley Rose, P.C.

(57) ABSTRACT

Methods and related systems for determining transducer delay time and transducer separation in ultrasonic flow meters. At least some of the illustrative embodiments are a method comprising measuring a delay time for a first transducer pair, measuring a total measured time for ultrasonic signals transmitted between a second transducer pair in an ultrasonic meter in which both the first and second transducer pairs are installed, calculating a parameter associated with the second transducer pair using the delay time of the first transducer pair and the total measured time for said second transducer pair.

20 Claims, 5 Drawing Sheets

U.S. PATENT DOCUMENTS

| | | | |
|---|---|---|---|
| 5,770,806 A * | | 6/1998 | Hiismaki .................. 73/861.29 |
| 5,777,237 A | | 7/1998 | Collier et al. |
| 5,777,892 A | | 7/1998 | Nabity et al. |
| 5,792,962 A | | 8/1998 | Constant et al. |
| 5,792,965 A | | 8/1998 | Bignell |
| 5,804,739 A | | 9/1998 | Herrmann et al. |
| 5,811,688 A | | 9/1998 | Marsh et al. |
| 5,811,689 A | | 9/1998 | Collier et al. |
| 5,814,737 A | | 9/1998 | Brown |
| 5,818,735 A | | 10/1998 | Tigwell et al. |
| 5,824,915 A | | 10/1998 | Hujzer et al. |
| 5,835,884 A | | 11/1998 | Brown |
| 5,844,144 A | | 12/1998 | Jennings |
| 5,905,207 A | | 5/1999 | Schalk |
| 5,908,992 A | | 6/1999 | Roskam et al. |
| 5,932,812 A | | 8/1999 | Delsing |
| 5,947,903 A | | 9/1999 | Ohtsuki et al. |
| 5,987,997 A | | 11/1999 | Roskam et al. |
| 6,026,693 A | | 2/2000 | Baumoel et al. |
| 6,041,663 A | | 3/2000 | de Boer |
| 6,062,091 A | | 5/2000 | Baumoel |
| 6,065,350 A | | 5/2000 | Hill et al. |
| 6,067,861 A | | 5/2000 | Shekarriz et al. |
| 6,089,103 A | | 7/2000 | Smith |
| 6,098,466 A | | 8/2000 | Shkarlet |
| 6,098,467 A | | 8/2000 | Wallen |
| 6,176,143 B1 | | 1/2001 | Mo et al. |
| 6,178,827 B1 | | 1/2001 | Feller |
| 6,189,389 B1 | | 2/2001 | van Bekkum et al. |
| 6,202,494 B1 | | 3/2001 | Riebel et al. |
| 6,216,091 B1 | | 4/2001 | Hammond |
| 6,227,040 B1 | | 5/2001 | Hastings et al. |
| 6,244,114 B1 | | 6/2001 | Kowal et al. |
| 6,293,156 B1 | | 9/2001 | Shen et al. |
| 6,298,735 B1 | | 10/2001 | Dias et al. |
| 6,305,233 B1 | | 10/2001 | Braathen et al. |
| 6,318,179 B1 | | 11/2001 | Hamilton et al. |
| 6,338,277 B1 | | 1/2002 | Diston et al. |
| 6,343,511 B1 | | 2/2002 | Lynnworth et al. |
| 6,345,538 B1 | | 2/2002 | Krahbichler et al. |
| 6,345,539 B1 | | 2/2002 | Rawes et al. |
| 6,370,963 B1 | | 4/2002 | Feller |
| 6,386,047 B1 | | 5/2002 | Chang |
| 6,390,999 B1 | | 5/2002 | Zscheile et al. |
| 6,405,603 B1 | | 6/2002 | Baumoel |
| 6,408,699 B1 | | 6/2002 | Moss et al. |
| 6,418,796 B1 | | 7/2002 | Baumoel |
| 6,422,093 B1 | | 7/2002 | Feller |
| 6,422,094 B1 | | 7/2002 | Ganshorn |
| 6,435,037 B1 | | 8/2002 | Doten |
| 6,435,038 B1 | | 8/2002 | Nam |
| 6,435,040 B1 | | 8/2002 | Feller |
| 6,446,494 B1 | | 9/2002 | Hastings et al. |
| 6,457,371 B1 | | 10/2002 | Feller |
| 6,460,419 B1 | | 10/2002 | Su |
| 6,463,808 B1 | | 10/2002 | Hammond |
| 6,470,757 B1 | | 10/2002 | Chang |
| 6,474,174 B1 | | 11/2002 | Su |
| 6,494,105 B1 | | 12/2002 | Gallagher |
| 6,502,465 B1 | | 1/2003 | Vedapuri et al. |
| 6,508,134 B1 | | 1/2003 | Feller |
| 6,513,391 B1 | | 2/2003 | van Bekkum et al. |
| 6,532,828 B1 | | 3/2003 | Delsing |
| 6,564,649 B1 | | 5/2003 | Toda |
| 6,575,043 B1 | | 6/2003 | Huang et al. |
| 6,575,044 B1 | | 6/2003 | Feller |
| 6,575,927 B1 | | 6/2003 | Weitzel et al. |
| 6,584,860 B1 | | 7/2003 | Feller et al. |
| 6,584,861 B1 | | 7/2003 | Jespersen |
| 6,584,862 B1 | | 7/2003 | Molenaar |
| 6,595,071 B1 | | 7/2003 | Doten |
| 6,601,459 B1 | | 8/2003 | Jenni |
| 6,606,916 B1 | | 8/2003 | Bignell et al. |
| 6,609,069 B1 | | 8/2003 | Gysling |
| 6,609,430 B1 | | 8/2003 | Joshi et al. |
| 6,615,674 B1 | | 9/2003 | Ohnishi |
| 6,622,572 B1 | | 9/2003 | Kobayashi et al. |
| 6,626,049 B1 | | 9/2003 | Ao |
| 6,644,119 B1 | | 11/2003 | Sinha |
| 6,644,128 B1 | | 11/2003 | Byatt et al. |
| 6,647,805 B1 | | 11/2003 | Kobayashi et al. |
| 6,647,806 B1 | | 11/2003 | Estrada et al. |
| 6,658,944 B1 | | 12/2003 | Melnikov et al. |
| 6,669,636 B1 | | 12/2003 | van Klooster |
| 6,681,641 B1 | | 1/2004 | Beaumoel |
| 6,696,843 B1 | | 2/2004 | Beneteau et al. |
| 6,715,366 B1 | | 4/2004 | Ohnishi |
| 6,732,595 B1 | | 5/2004 | Lynnworth |
| 6,739,203 B1 | | 5/2004 | Feldman et al. |
| 6,745,632 B1 | | 6/2004 | Dryer et al. |
| 6,758,100 B1 | | 7/2004 | Huang |
| 6,782,150 B1 | | 8/2004 | Davis et al. |
| 6,817,250 B1 | | 11/2004 | Cardelius et al. |
| 6,820,500 B1 | | 11/2004 | Wilda |
| 6,851,322 B1 | | 2/2005 | Gallagher |
| 6,854,339 B1 | | 2/2005 | Moscaritolo et al. |
| 6,877,375 B1 | | 4/2005 | Greenwood |
| 6,889,560 B1 | | 5/2005 | Sinha |
| 6,895,825 B1 | | 5/2005 | Barkhoudarian |
| 6,901,812 B1 | | 6/2005 | Moscaritolo et al. |
| 6,907,361 B1 | | 6/2005 | Molenaar et al. |
| 6,912,918 B1 | | 7/2005 | Lynnworth et al. |
| 2002/0011119 A1 | | 1/2002 | Bignell et al. |
| 2002/0011120 A1 | | 1/2002 | Huang |
| 2002/0050176 A1 | | 5/2002 | Su |
| 2002/0053243 A1 | | 5/2002 | Su |
| 2002/0108450 A1 | | 8/2002 | Ohnishi |
| 2002/0124661 A1 | | 9/2002 | Wagner |
| 2002/0139198 A1 | | 10/2002 | Ohnishi |
| 2002/0148302 A1 | | 10/2002 | Kobayashi et al. |
| 2002/0189366 A1 | | 12/2002 | Ipponmatsu et al. |
| 2002/0189367 A1 | | 12/2002 | Gomm et al. |
| 2003/0041674 A1 | | 3/2003 | Ohnishi |
| 2003/0047007 A1 | | 3/2003 | Baumoel |
| 2003/0051558 A1 | | 3/2003 | Melnikov et al. |
| 2003/0136200 A1 | | 7/2003 | Cardelius et al. |
| 2003/0172743 A1 | | 9/2003 | Ao et al. |
| 2004/0007079 A1 | | 1/2004 | Wilda |
| 2004/0011140 A1 | | 1/2004 | Coulthard et al. |
| 2004/0011141 A1 | | 1/2004 | Lynnworth |
| 2004/0035190 A1 | | 2/2004 | Sinha |
| 2005/0011279 A1 | | 1/2005 | Takeda et al. |
| 2005/0061084 A1 | | 3/2005 | Brun |
| 2005/0061085 A1 | | 3/2005 | Jespersen |
| 2005/0066744 A1 | | 3/2005 | Kupnik et al. |
| 2005/0097943 A1 | | 5/2005 | Sinha |

OTHER PUBLICATIONS

Lunde, et al., "Transient Diffraction Effects in Ultrasonic Meters for Volumetric, Mass and Energy Flow Measurement of Natural Gas," 21st International North Sea Flow Measurement Workshop, Tonesberg, Norway, Oct. 2002, 26 pp.

* cited by examiner

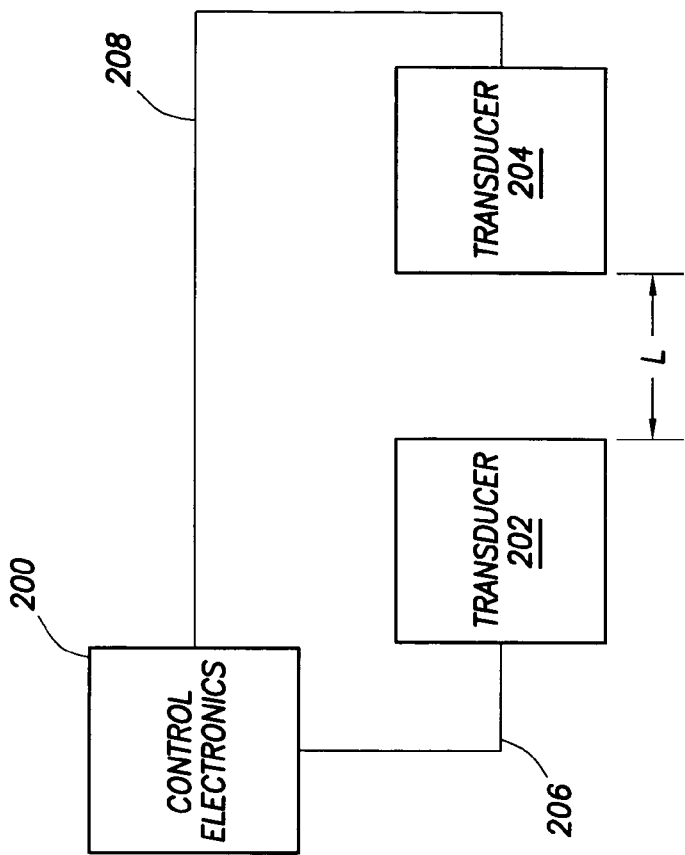
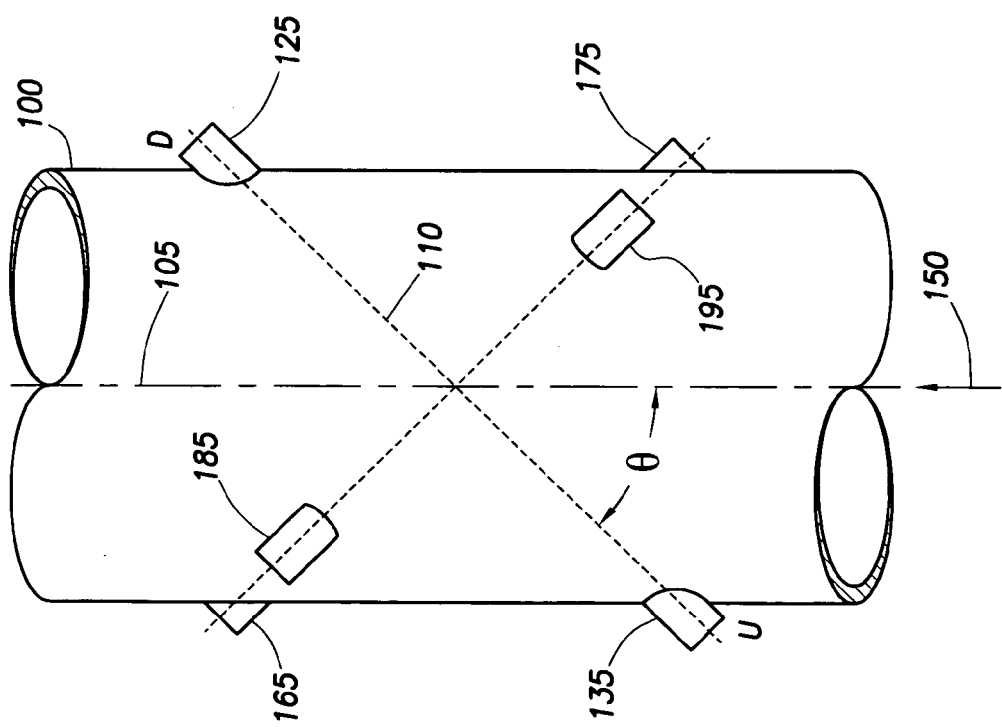
FIG. 1c
FIG. 2

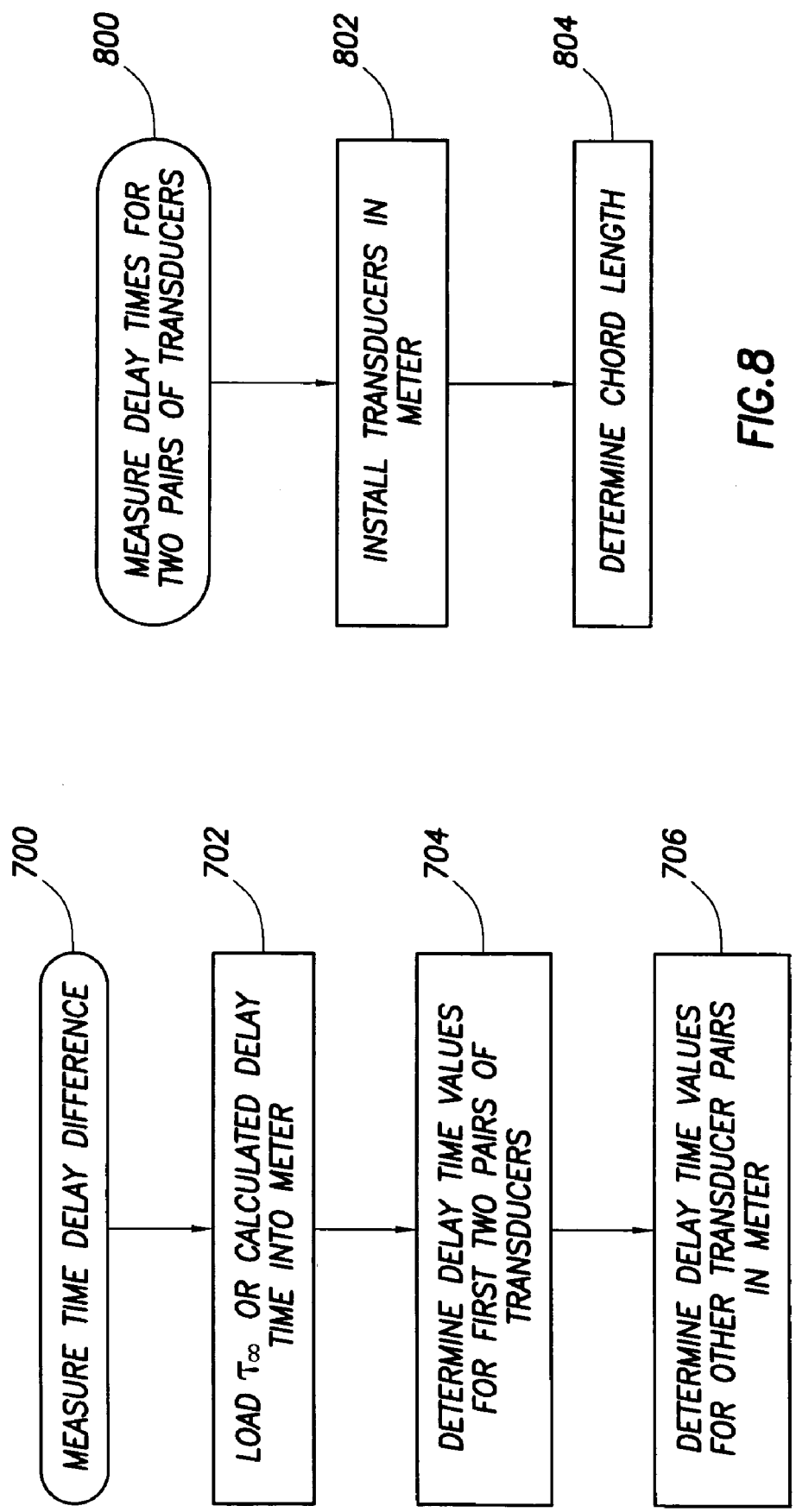

METHODS FOR DETERMINING TRANSDUCER DELAY TIME AND TRANSDUCER SEPARATION IN ULTRASONIC FLOW METERS

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

1. Field of the Invention

Various embodiments of the invention relate to the detection of errors in ultrasonic transit time measurements. More particularly, embodiments of the invention relate to establishing the delay times inherent in one or more transducer pairs used in an ultrasonic meter, and identification of when delay time errors have been measured inaccurately or have changed. Related embodiments are directed to the identification of mistakes in measured distance between transducer pairs in an ultrasonic meter.

2. Description of the Related Art

After hydrocarbons have been removed from the ground, the fluid stream (such as natural gas) is transported from place to place via pipelines. It is desirable to know with accuracy the amount of fluid flowing in the stream, and particular accuracy is demanded when the fluid is changing hands, or "custody transfer." Even where custody transfer is not taking place, however, measurement accuracy is desirable.

Measurement of flow velocity and speed of sound in the ultrasonic meter, in order to determine the amount of fluid flow, depends on measured transit time or time of flight of the ultrasonic signals. A difficulty that arises in measuring precisely the time of flight for an ultrasonic signal is determining the actual time of flight as contrasted to a measured time of flight. The calculation of fluid flow velocity, as well as the speed of sound for the fluid, is based on the "actual" time of flight, which excludes delays from the electronics, matching layers and other factors.

Thus there exists a need for methods and systems that improve the accuracy of the actual time of flight measurements and identify the cause of inaccuracies in actual time of flight measurements.

SUMMARY

The problems noted above are solved in large by methods and related systems for determining transducer delay time and transducer separation in ultrasonic flow meters. At least some of the illustrative embodiments are a method comprising measuring a delay time for a first transducer pair, measuring a total measured time for ultrasonic signals transmitted between a second transducer pair in an ultrasonic meter in which both the first and second transducer pairs are installed, and calculating a parameter associated with the second transducer pair using the delay time of the first transducer pair and the total measured time for said second transducer pair.

Other illustrative embodiments are a method comprising measuring a delay time difference between a first pair of transducers and a second pair of transducers, measuring a first total measured time for ultrasonic signals transmitted between the first transducer pair in an ultrasonic meter in which both the first and second transducer pairs are installed, measuring a second total measured time for ultrasonic signals transmitted between the second transducer pair in the ultrasonic meter, and calculating a delay time for the first transducer pair using the delay time difference and the total measured times.

Yet still other illustrative embodiments are an ultrasonic meter comprising a spool piece which fluidly couples within a conduit carrying fluid flow, control electronics associated with the spool piece, a first chord through the spool piece (the first chord accepts a first pair of transducers, and the control electronics couple to the first pair of transducers), and a second chord through the spool piece (the second chord accepts a second pair of transducers, and the control electronics couple to the second pair of transducers). The control electronics accept a value proportional to a delay time for the first pair of transducers, and the control electronics calculate a parameter associated with the second pair of transducers using at least the value proportional to the delay time for the first pair of transducers.

BRIEF DESCRIPTION OF THE DRAWINGS

For a more detailed description of embodiments of the invention, reference will now be made to the accompanying drawings, wherein:

FIG. 1C is a top view of a spoolpiece housing transducer pairs;

FIG. 2 illustrates a transducer pair and related control electronics;

FIG. 7 illustrates a method of determining delay times using a delay time difference between two pairs of transducers; and FIG. 8 illustrates a method of determining chord length.

Notation and Nomenclature

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION

Figure 1A:
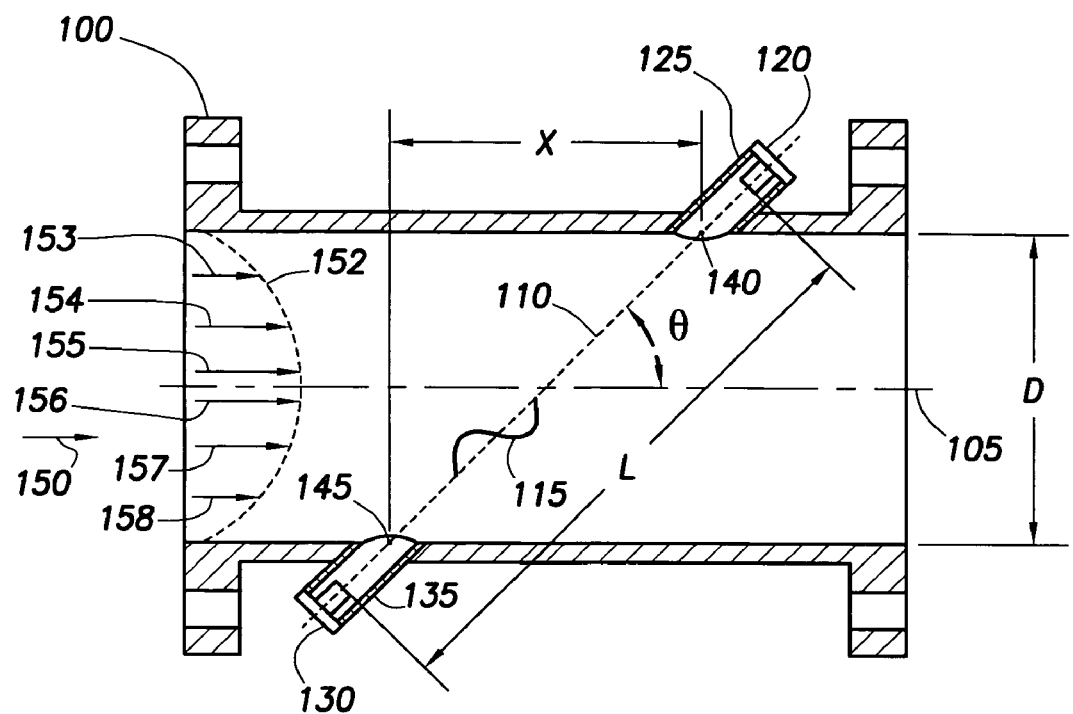
FIG. 1A is a cut-away top view of an ultrasonic gas flow meter.

FIG. 1A shows an ultrasonic meter suitable for measuring fluid flow in accordance with embodiments of the invention.

Spoolpiece 100, suitable for placement between sections of a pipeline, has a predetermined size and thus defines a measurement section. As used herein, the term "pipeline" when used in reference to an ultrasonic meter may refer also to the spoolpiece or other appropriate housing across which ultrasonic signals are sent. A pair of transducers 120 and 130, and their respective housings 125 and 135, are located along the length of spoolpiece 100. Transducers 120 and 130 are preferably ultrasonic transceivers, meaning that they both generate and receive ultrasonic signals. "Ultrasonic" in this context refers to frequencies above about 20 kilohertz. These signals may be generated and received by a piezoelectric element in each transducer. To generate an ultrasonic signal, the piezoelectric element is stimulated electrically, and it responds by vibrating. The vibration of the piezoelectric element generates an ultrasonic signal that travels through the fluid across the spoolpiece to the corresponding transducer of the transducer pair. Similarly, upon being struck by an ultrasonic signal, the receiving piezoelectric element vibrates and generates an electrical signal that is detected, digitized, and analyzed by electronics associated with the meter.

A path 110, sometimes referred to as a "chord," exists between transducers 120 and 130 at an angle $\theta$ to a centerline 105. The length of "chord" 110 is the distance between the face of transducer 120 to the face of transducer 130. Points 140 and 145 define the locations where acoustic signals generated by transducers 120 and 130 enter and leave fluid flowing through the spoolpiece 100 (i.e. the entrance to the spoolpiece bore). The position of transducers 120 and 130 may be defined by the angle $\theta$, by a first length L measured between transducers 120 and 130, a second length X corresponding to the axial distance between points 140 and 145, and a third length D corresponding to the pipe diameter. In most cases distances D, X and L are precisely determined during meter fabrication. Further, transducers such as 120 and 130 are usually placed a specific distance from points 140 and 145, respectively, regardless of meter size (i.e. spoolpiece size). A fluid, such as natural gas, flows in a direction 150 with a velocity profile 152. Velocity vectors 153–158 illustrate that the gas velocity through spool piece 100 increases as centerline 105 of spoolpiece 100 is approached.

Initially, downstream transducer 120 generates an ultrasonic signal that is then received at, and detected by, upstream transducer 130. Some time later, the upstream transducer 130 generates a return ultrasonic signal that is subsequently received at, and detected by, the downstream transducer 120. Thus, the transducers 120 and 130 play "pitch and catch" with ultrasonic signals 115 along chordal path 110. During operation, this sequence may occur thousands of times per minute.

The transit time of the ultrasonic wave 115 between transducers 120 and 130 depends in part upon whether the ultrasonic signal 115 is traveling upstream or downstream with respect to the fluid flow. The transit time for an ultrasonic signal traveling downstream (i.e. in the same direction as the flow) is less than its transit time when traveling upstream (i.e. against the flow). The upstream and downstream transit times can be used to calculate the average velocity along the signal path, and may also be used to calculate the speed of sound in the fluid flow. Given the cross-sectional measurements of the meter carrying the fluid, the average velocity over the area of the meter bore may be used to find the volume of fluid flowing through the meter or pipeline 100.

Figure 1B:
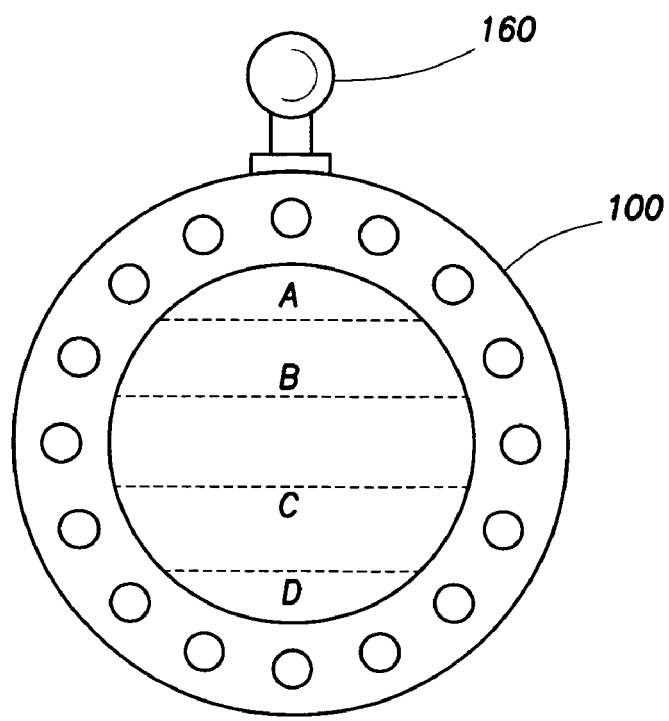
FIG. 1B is an end view of a spoolpiece including chordal paths A–D.

Ultrasonic flow meters can have one or more paths. FIG. 1B illustrates a multi-path ultrasonic meter. In these embodiments spool piece 100 comprises four chordal paths A, B, C, and D at varying levels through the fluid flow. Each chordal path A–D corresponds to two transducers behaving alternately as a transmitter and receiver. Also shown are control electronics 160, which acquires and processes the data from the four chordal paths A–D. Hidden from view in FIG. 1B are the four pairs of transducers that correspond to chordal paths A–D.

The precise arrangement of the four pairs of transducers may be more easily understood by reference to FIG. 1C. Four pairs of transducer ports are mounted on spool piece 100. Each pair of transducer ports corresponds to a single chordal path of FIG. 1B. A first pair of transducer ports 125 and 135 includes transducers 120 and 130 (FIG. 1A) recessed slightly from the spool piece 100. The transducers are mounted at a non-perpendicular angle $\theta$ to centerline 105 of spool piece 100. Another pair of transducer ports comprising ports 165 and 175 (only partially in view) including associated transducers is mounted so that its chordal path loosely forms an "X" with respect to the chordal path of transducer ports 125 and 135. Similarly, transducer ports 185 and 195 are placed parallel to transducer ports 165 and 175 but at a different "level" (i.e. a different radial position in the pipe or meter spoolpiece). Not explicitly shown in FIG. 1C is a fourth pair of transducers and transducer ports. Taking FIGS. 1B and 1C together, the pairs of transducers are arranged such that the upper two pairs of transducers corresponding to chords A and B form an X, and the lower two pairs of transducers corresponding to chords C and D also form an X. The flow velocity of the fluid may be determined at each chord A–D to obtain chordal flow velocities, and the chordal flow velocities are combined to determine an average flow velocity over the entire pipe. From the average flow velocity, the amount of fluid flowing in the pipeline may be determined.

FIG. 2 illustrates in greater detail various components of a transducer pair in order to introduce concepts related to various embodiments of the invention. In particular, FIG. 2 illustrates control electronics 200 which couple to a first transducer 202 and a second transducer 204. For purposes of this discussion, transducer 202 is the sending transducer, and transducer 204 is the receiving transducer; however, in actual operation these roles change alternately. Control electronics 200 couple to the transducer 202 by way of electrical signal line 206, and control electronics 200 couple to the transducer 204 by way of electrical signal line 208. Control electronics 200, possibly comprising a microprocessor executing a program, sends a signal along line 206 to transducer 202, and in turn transducer 202 generates an acoustic signal. The acoustic signal then traverses the distance L between transducer 202 and transducer 204 in the fluid. Transducer 204 receives the acoustic energy, and sends an electrical signal along line 208 to the control electronics 200. Control electronics 200 may start a timer when the signal to the transducer 202 departs the control electronics, and may stop the timer when the signal from transducer 204 arrives at the control electronics 200; however, the total time measured by the control electronics 200 comprises not only the transit time of the acoustic signal through the fluid between transducer 202 and 204, but also delays associated with propagation of the signal from the control electronics 200 to the transducer 202, propagation delay between the transducer 204 and the control electronics 208, delay through the transducers and related matching layers, and a delay between the first arrival of the received signal until the actual point of measurement of the received signal (which point of measurement is affected by the diffraction effect, and is discussed more thoroughly below). The propagation delay between the control electronics and the transducers and vice versa is negligible in most circumstances, but if not it is at least constant for fixed length wires between the control electronics and the transducers. The diffraction effect, however, is dependent upon the distance between the transducers.

Figure 3A:
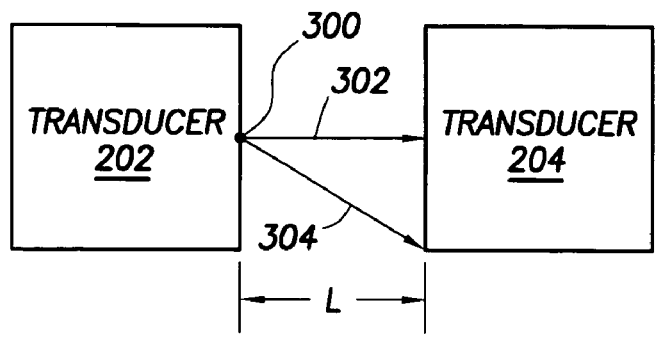
FIGS. 3A and 3B illustrate physical effects of differing transducer separation.
Figure 3B:
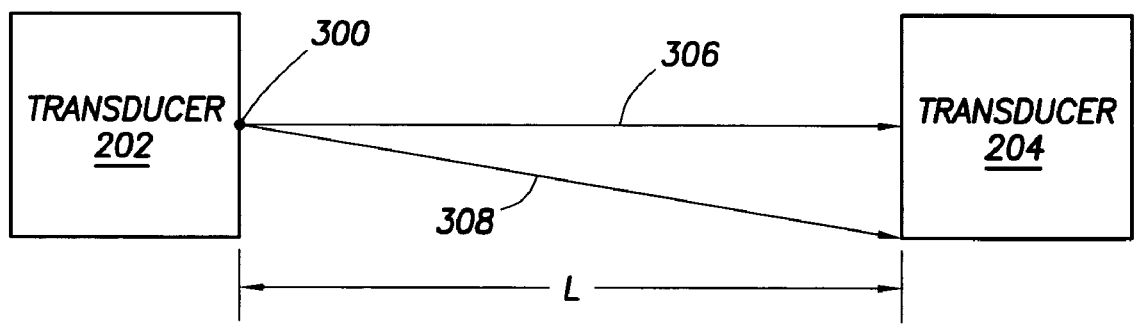

Although the inventor of the subject matter of this specification does not wish to be tied to any particular physical theory of why the diffraction effect exists, FIGS. 3A and 3B illustrate one possible physical theory for the diffraction effect. In particular, FIG. 3A illustrates transducer 202 and transducer 204 having a relatively close distance L between the transducers. Considering a single element 300 of the transducer 202 vibrating to generate an acoustic signal (with the understanding that the entire face of the transducer is also vibrating to create the signal), the distances that the acoustic signals travel to reach the face of transducer 204 are different. In particular, a portion of the overall acoustic signal may travel along line 302 and impinge upon the face of transducer 204 at the location indicated. Another portion of the overall acoustic signal may travel along line 304 and impinge upon the transducer 204 at the location indicated. As is illustrated, the distances that these portions of the acoustic signal travel are different, and thus the composite signal received by transducer 204 may be affected by constructive and/or destructive interference of the various portions of the acoustic signal. FIG. 3A illustrates only two possible paths, but an acoustic signal emanating from point 300 on transducer 204 spreads out in a wavefront, with portions of the wavefront impinging on transducer 204 at different times.

By contrast, FIG. 3B illustrates transducer 202 and transducer 204 with a relatively long distant L between the transducers. The portion of the overall acoustic signal emanating from element 300 of transducer 202 may travel along path 306 or 308; however, as the distance L increases, the length of paths 306 and 308 asymptotically approaches the same value. Thus, the constructive and/or destructive interference associated with receiving the acoustic signal is different, which affects various characteristics of the received signal.

Figure 4:
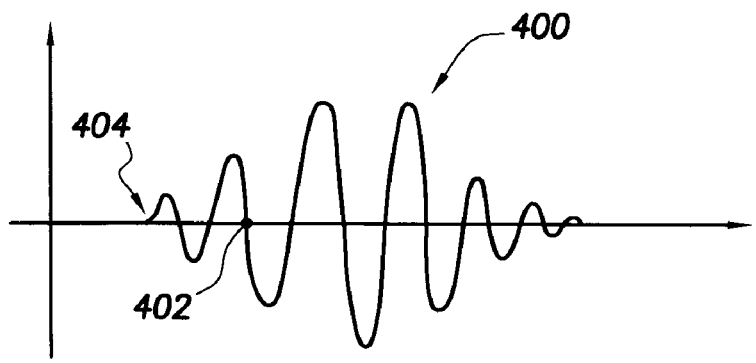
FIG. 4 illustrates a received waveform.

In particular, and referring to FIG. 4, an illustrative received signal 400 is shown, such as may be received by transducer 204. While any feature of the received signal 400 may be used as a trigger for calculating transit time, in accordance with some embodiments of the invention the second positive-to-negative going zero crossing 402 is used. Thus, the control electronics 200 (FIG. 2) stop the timer for the total measured time at the point when the second zero crossing 402 is found. However, the diffraction effect manifests itself as a skewing in time of the received signal. More particularly, the time between the first movement 404 and the selected feature grows longer as distance L gets smaller, even if all of the parameters such as speed of sound and/or fluid flow are held constant. The time associated with the diffraction effect in relation to the total measured time, and more importantly to the transit time, is non-negligible, and thus in accordance with embodiments of the invention the diffraction effect is accounted for in calculating transit time. For purposes of this specification and in the claims, the term "delay time" encompasses the total measured time less the transit time. Stated otherwise, transit time is the total measured time of flight between the transducers corrected for diffraction effect and other time delays. Thus, delay time includes not only propagation delays associated with electronics, transducers and matching layers, but also any delay caused by the diffraction effect.

A first step in executing methods in accordance with at least some embodiments is determining the delay time for a pair of transducers if infinitely spaced apart. In some embodiments this determination is made in a test cell. The test cell calculated delay time at a transducer separation at infinity is then used when placing a pair of transducers in an ultrasonic meter, and the delay time used in the actual meter is the delay time at an infinite separation corrected for actual separation. In accordance with embodiments of the invention the correction goes according to substantially the following equation:

$$\tau = \tau_\infty + \frac{a^2}{2cL} \quad (1)$$

where $\tau_\infty$ is the delay time at a transducer separation of infinity; $\tau$ is the delay time at a transducer separation of L; a is the radius of the transducer (for a given transducer design the "radius" of the transducer could be determined experimentally); L is the distance between the transducers; and c is the speed of sound of the fluid between the transducers.

The adjustment of the delay time value from the test cell to an actual meter may be referred to as adjusting or compensating the delay time. One manner to compensate the delay time is to load the calculated delay time at infinity $\tau_\infty$ into a processor associated with the meter and let firmware installed in the meter calculate the correct delay times using the distance L between transducers in the meter. Delay time could then be dynamically corrected for changes in speed of sound of the fluid within the meter.

In alternative embodiments delay time may be measured in an ultrasonic meter. This second technique has the advantage of obviating the need to compensate for an altered distance between the individual transducers, but it requires a long settling time to achieve a near constant (i.e. acceptably stable) speed of sound of fluid within the meter. In yet still other embodiments, temperature measurements at different levels in the meter may be used to compensate for the effect of temperature, and in these alternative embodiments, the temperature at the level of one of the chords (chord B, for instance) could be measured and the delay time for chord B determined. The alternative embodiments of measuring temperature at chord level would not require a long settling time. In accordance with these embodiments of the invention, an ultrasonic meter may compensate for the diffraction effect in spite of the fact that the test cell and/or actual meter has a different face-to-face separation between the transducers, and also in spite of the fact that the speed of sound of the fluid in the test cell and/or meter where the delay time was measured was different.

In the related art, each and every transducer pair has its delay time measured, and the delay time is then provided to control electronics in the actual ultrasonic meter in which the transducer pair is installed to compensate for the delay time effects (keeping in mind that the related art does not, however, compensate for the diffraction effect). However, the inventor of the present specification has found that so long as the delay time at infinite separation ($\tau_\infty$) is calculated for one pair of transducers, such as by a determination made in a test cell, the delay time for other transducer pairs in an ultrasonic meter may be determined without specifically testing those other pairs of transducers in a test cell.

Figure 5:
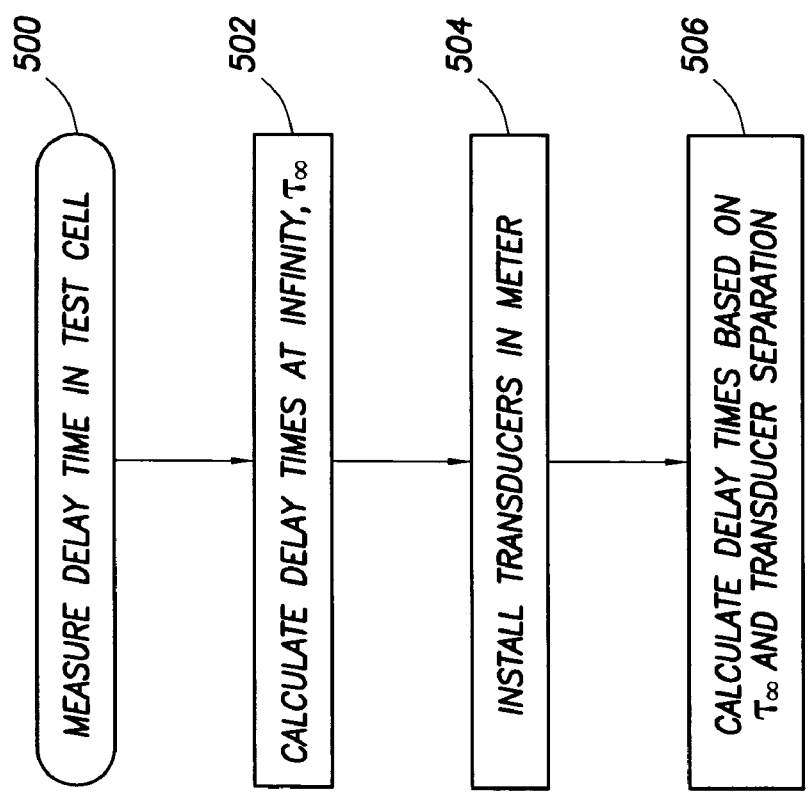
FIG. 5 illustrates a method of calculating delay time.

FIG. 5 illustrates a method of determining delay time in accordance with embodiments of the invention. In particular, the process starts by measuring delay time in a test cell (block 500). Given that the distance L between transducers in the test cell should be known, the delay time at an infinite separation ($\tau_\infty$) may be calculated (block 502), e.g., using equation (1) above (block 502). At some time thereafter, the transducer pair may be installed in an actual meter (block 504), and the delay time ($\tau$) may be calculated using the determined delay time at infinite separation ($\tau_\infty$) and the face-to-face separation L (block 506).

In accordance with further embodiments, delay times of other chords, possibly chords whose delay time was not measured or is not known, may be determined by using a function η (Eta). To derive Eta, it is known that for a chord A of known length $L_A$, an ultrasonic wave traveling at the speed of sound c through a homogeneous medium at zero flow traverses the length of the chord $L_A$ in time $t_A$. The time $t_A$ is also the average transit time of the ultrasonic signal along chord A as fluid moves through the meter. Algebraically $t_A$ may be expressed as:

$$t_A = \frac{L_A}{c} \quad (2)$$

By algebraic manipulation it follows that:

$$c = \frac{L_A}{t_A} \quad (3)$$

This is just as true for a second chord B, such that:

$$c = \frac{L_B}{t_B} \quad (4)$$

The transit time of an ultrasonic signal is not the total measured time as there is time delay inherent in the electronics, transducers, matching layers and the diffraction effect discussed above. Total measured time T may be defined as:

$$T = t + \tau \quad (5)$$

where T is total measured time; t is transit time of the ultrasonic signal; and τ is delay time associated with the physical system, such as delays associated with electronics, transducers, matching layers and/or diffraction effect. Where the delay times are the same for chords A and B, τ may be used as the delay time for both chords A and B. From equation (4) the speed of sound may be expressed as:

$$c = \frac{L_A}{T_A - \tau} \quad (6)$$

It follows from an assumption that the speed of sound for the medium is the same at both chord A and chord B that:

$$L_A(T_B - \tau) = L_B(T_A - \tau) \quad (7)$$

and $$\tau = \frac{L_B T_A - L_A T_B}{L_B - L_A} \quad (8)$$

If ΔL is defined as:

$$\Delta L = L_B - L_A \quad (9)$$

then τ may be expressed as:

$$\tau = \frac{L_B T_A}{\Delta L} - \frac{L_A T_B}{\Delta L} \quad (10)$$

The delay time for the transducer pair associated with chord A, $\tau_A$, and the delay time for the transducer pair associated with chord B, $\tau_B$, may not be the same. However, assuming for purposes of deriving Eta that $\tau_A$ and $\tau_B$ are known, each meter is assumed to be calibrated to factor out these transducer delay times. Under the assumptions, $\tau_A$ and $\tau_B$ are then equal to zero and therefore the same.

Since the total measured time T is defined as the transit time, t, plus delay time, τ, transit time can be substituted for total measured time T where there has already been delay time correction to result in:

$$\frac{L_B t_A}{\Delta L} - \frac{L_A t_B}{\Delta L} = 0 \quad (11)$$

A variable η (Eta), may then be established:

$$\eta = \frac{L_B t_A}{\Delta L} - \frac{L_A t_B}{\Delta L} \quad (12)$$

where $L_A$ is length of chord A; $L_B$ is length of chord B; $t_A$ is transit time of ultrasonic signals traveling along chord A; $t_B$ is transit time of ultrasonic signals traveling along chord B; and ΔL is $L_B - L_A$.

Letting "te" equal the transit time error, equation (12) can be rewritten:

$$\eta = \frac{L_{Long} te_{Short} - L_{Short} te_{Long}}{L_{Long} - L_{Short}} \quad (13)$$

If B is the longer chord, then $L_{Long}$ corresponds to the length of chord B, $L_{Short}$ corresponds to the length of chord A, $te_{Short}$ is the transit time error of chord A and $te_{Long}$ is the transit time error of chord B. If there is no error in the delay time used by the processor in relation to the actual delay time for the transducer pairs of chord A and chord B, then Eta will be substantially zero. It also should be noted that Eta will be non-zero if there is a misidentification of the arrival times for the ultrasonic signals as by peak selection errors, which may be detected as described in U.S. Pat. No. 6,816,808 entitled, "Peak Switch Detector for Transit Time Ultrasonic Meters," which patent is assigned to the same assignee as this specification. Changes in Eta due to peak selection errors can be distinguished from other delay time errors because of their usually differing magnitudes. Eta may be non-zero as well in the presence of fouling of the transducers.

Figure 6:
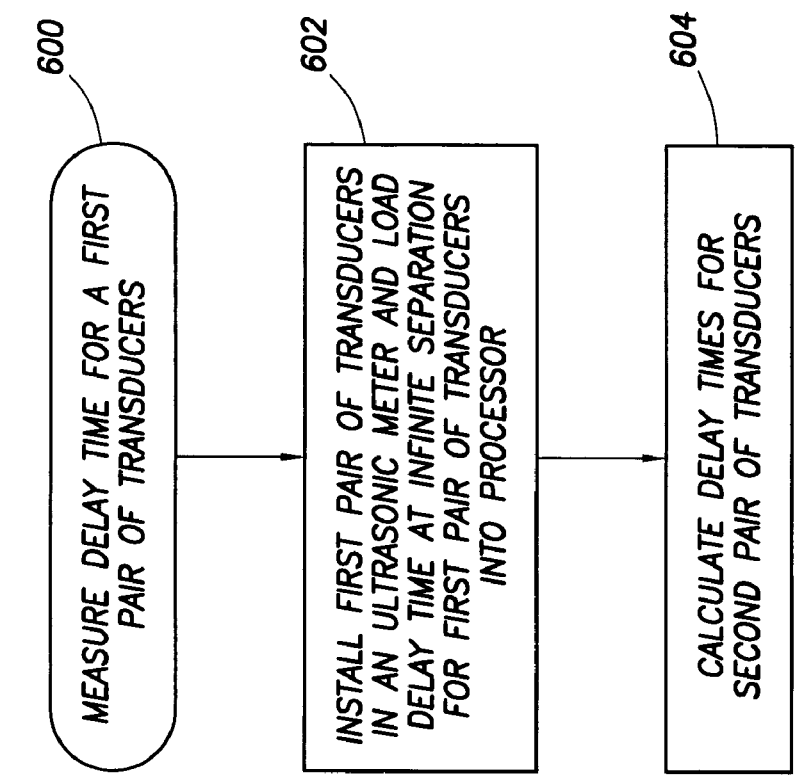
FIG. 6 illustrates a method a calculating delay time for a second transducer pair after measuring the delay time of a first transducer pair.

Having now derived an equation for Eta, FIG. 6 illustrates a method that may be implemented in accordance with embodiments of the invention to calculate the delay time for a pair of transducers whose delay time at infinite separation ($\tau_\infty$) was not determined using a test cell or other meter by using a first pair of transducers whose delay time is measured and/or known. In particular, the process starts by measuring the delay time for a first pair of transducers (block 600). As discussed above, this delay time measurement may be made in a test cell, or in an actual ultrasonic meter. Thereafter, the first pair of transducers is installed in an ultrasonic meter that comprises a second pair of transducers whose delay time is not accurately known, and the delay time at infinite separation ($\tau_\infty$) for the first pair of transducers is loaded into a processor associated with the ultrasonic meter (block 602). In these cases, the processor for the meter calculates the delay time ($\tau$) using the transducer spacing. In alternative embodiments, the delay time ($\tau$) may be calculated externally and supplied to the meter directly. The delay time for the second pair of transducers may be set at a default value, or possibly at a measured value whose accuracy is in question. Thereafter, the delay time for the second pair of transducers in the ultrasonic meter may be calculated knowing the chord length associated with each pair of transducers, calculating Eta (e.g., by equations (14) or (15) below) and assuming the time error of the first pair of transducers to be equal or substantially equal to zero. By algebraic manipulation of equation (13), the transit time error, which is the delay time error, associated with the second pair of transducers may be determined (block 604).

The above derivation of Eta is based on an assumption of zero flow through the meter or test cell having therein a homogeneous medium. In a real-world application the assumption of a homogeneous medium is not necessarily true at very low velocities, due to stratification and convection. At high flow velocities, turbulence and pressure surges disturb the homogeneity of the medium. Some embodiments implement the underlying theory of the Eta equations by use of the measured speed of sound (c). By using a meter with flow therethrough, the fluid within the meter becomes homogenous, and therefore the speed of sound at each chord will be substantially the same. In some embodiments average transit time $t_A$ is based on the average of a batch of upstream and downstream measurements for chord A. A "batch" of measurements is a set of measurements (e.g., 20) that are combined (e.g. true average, average with outliers not considered, moving average, etc). Similarly, $t_B$ is based on the average of a batch of upstream and downstream transit time measurements for chord B. However, it is known that $t_A = L_A/c_A$ and $t_B = L_B/c_B$, and algebraically it follows from equation (12) that:

$$\eta = \frac{L_B L_A (c_B - c_A)}{\Delta L c_A c_B} \tag{14}$$

where $\eta$ is error indicator Eta; $L_A$, $L_B$ are lengths of chords A and B; $c_A$, $c_B$ are values for speed of sound measured for chords A and B; and $\Delta L$ is difference in the lengths of chords A and B. Alternately, equation (14) may be stated:

$$\eta = \frac{L_{Long} L_{Short} (C_{Long} - C_{Short})}{C_{Long} C_{Short} (L_{Long} - L_{Short})} \tag{15}$$

Equation (15) for Eta presents an additional advantage that because some ultrasonic meters may calculate speed of sound for the fluid transported through the meter with respect to each chord, and a value for Eta may therefore be computed while flow is present (whereas equation (13) assumes a zero flow).

A number of variations exist with respect to the method of FIG. 6. In a first case, it is assumed that the delay time is known accurately for one of the chords. For purposes of illustration, it is assumed that the delay time is known for a long chord. The exact delay time on the short chord is unknown, however. As used herein, the term "long chord" implies that there is at least one chord of shorter length than the long chord. The term "short chord" implies that there is at least one chord of longer length than the short chord. An approximate value for the delay time of the short chord, $\tau_{ShortOld}$, may be known, or assumed, and may even be a value of zero (although a transducer pair will always have some associated delay time). With the delay time for the long chord known, the transit time error measurement error on the long chord is considered to be zero ($te_{long}=0$). Therefore, letting $\Delta L = L_{Long} - L_{Short}$, it follows from equation (13):

$$te_{Short} = \frac{\Delta L \eta}{L_{Long}} \tag{16}$$

where $L_{Long}$ is the distance between the transducers in a selected transducer pair spaced further apart than $L_{short}$; $L_{short}$ is the distance between the transducers in a selected transducer pair spaced closer together than $L_{Long}$; and $te_{short}$ is transit time error on the short chord. If $L_{Short}$ is correct then the new delay time, $\tau_{ShortNew}$, is:

$$\tau_{ShortNew} = \tau_{ShortOld} + te_{Short} \tag{17}$$

In the event that the user has confidence in the delay time at infinite separation ($\tau_\infty$) for the short chord, but $\eta \neq 0$, there may be an error in the measurement of the chord length for the short chord. If delay time at infinite separation ($\tau_\infty$) of the short chord is known to be correct, then the length correction ($L_{Cor}$) is:

$$L_{Cor} = te_{Short} C_{Long} \tag{18}$$

and the new short chord length ($L_{ShortNew}$) is:

$$L_{ShortNew} = L_{ShortOld} + L_{Cor} \tag{19}$$

In a second case with respect to FIG. 6, the delay time is known accurately for a short chord, with the variable of interest being delay time error on the long chord. Since the delay time for the short chord is known, its error is zero. Therefore it follows from equation (12):

$$te_{Short} = \frac{\Delta L \eta}{L_{Short}} \tag{20}$$

If $L_{Long}$ is correct then the new delay time ($\tau_{LongNew}$) is:

$$\tau_{LongNew} = \tau_{LongOld} + te_{Long} \quad (21)$$

The variable Eta may also be used when the known quantity is a delay time difference between a long chord and a short chord. FIG. 7 illustrates a method that may be implemented in accordance with embodiments of the invention to determine the delay time for pairs of transducers once a delay time difference between two transducers is known. In particular, the process starts by measuring the delay time difference for two pairs of transducers (block 700). It is noted that measuring the delay time difference between two pairs of transducers does not require that the speed of sound for the fluid be known, but the chord length as between the two transducers should be made the same to reduce measurement errors. Thereafter, the delay time for infinite separation ($\tau_\infty$), calculated delay time ($\tau$) corrected for diffraction effect, or a calculated delay time difference is loaded into a processor associated with an ultrasonic meter (block 702). Using Eta, a determination is then made as to the transit time error for the first two pairs of transducers (block 704). Then, Eta is equal to the transit time error for both chords. And finally, a determination of the delay times for other pairs of transducers is made using Eta (block 706), such as described in FIG. 6.

The procedure to determine delay time in each chord upon knowledge of a delay time difference is as follows. Let $\Delta te$ be the transit time error difference equal to $te_{long} - te_{short}$. It follows that:

$$\eta = \frac{L_{Long} te_{Short} - L_{Short}(te_{Short} + \Delta te)}{\Delta L} \quad (22)$$

And $$\eta = \frac{te_{Short}(L_{Long} - L_{Short}) - L_{Short}\Delta te}{\Delta L} \quad (23)$$

$$te_{Short} = \frac{\Delta L \eta + L_{Short}\Delta te}{\Delta L} \quad (24)$$

$$te_{Short} = \eta + \frac{L_{Short}\Delta te}{\Delta L} \quad (25)$$

Thus, the transit time error for the short chord may be determined from equation (25). The transit time error for the short chord may be used to determine a new delay time for the short chord, given substantially by the equation:

$$\tau_{ShortNew} = \tau_{ShortOld} + te_{Short} \quad (26)$$

From the assumption that $\Delta te$ equals $te_{Long}$ minus $te_{Short}$, it follows from knowing the value for $te_{Short}$, that $te_{Long}$ is:

$$te_{Long} = te_{Short} + \Delta te \quad (27)$$

And finally, the new delay time for the long chord may be found as follows:

$$\tau_{LongNew} = \tau_{LongOld} + te_{Long} \quad (28)$$

Since a delay time for both a long and a short chord is known, other delay times for other chords in the meter may be determined, as illustrated in FIG. 6. The illustrative method of FIG. 7 thus relies upon accurate L measurements, and its advantage lies in not requiring knowledge of the speed of sound of the fluid.

The equation for Eta derived above assumes that errors occurred in the delay time measurement. Another circumstance arises when the distance L between transducers of a transducer pair is uncertain. If the distance L is uncertain but there is confidence in delay time at infinite separation ($\tau_\infty$), a variable related to Eta, called Epsilon, can be used in order to determine whether the distance L between the transducers has been established properly, and if not the error in L.

FIG. 8 illustrates a method according to alternative embodiments of the invention to determine the spacing length for pairs of transducers once the delay time difference for the transducer pairs is known. The process starts by measuring the delay times for two pairs of transducers (block 800). Thereafter, the two pairs of transducers are installed into an ultrasonic meter for which one chord length is known or accurately measured (block 802). Thereafter, a determination is made as to the chord length of the other pair of transducers (block 804).

From equations (1) to (2) the true speed of sound, $C_{True}$, is:

$$C_{True} = \frac{L_{ShortTrue}}{t_{Short}} = \frac{L_{LongTrue}}{t_{Long}} \quad (29)$$

If errors exist in the length measurement for the short chord:

$$C_{Short} = \frac{L_{Short}}{t_{Short}} = \frac{L_{ShortTrue} + L_{ShortError}}{t_{Short}} \quad (30)$$

Likewise, if errors exist in the length measurement for the long chord:

$$C_{Long} = \frac{L_{Long}}{t_{Long}} = \frac{L_{LongTrue} + L_{LongError}}{t_{Long}} \quad (31)$$

Combining equations (30) and (31) yields:

$$C_{Long} - C_{Short} = \frac{L_{LongTrue} + L_{LongError}}{t_{Long}} - \frac{L_{ShortTrue} + L_{ShortError}}{t_{Short}} \quad (32)$$

Which, by algebraic manipulation becomes:

$$\frac{L_{LongTrue}}{t_{Long}} - \frac{L_{ShortTrue}}{t_{Short}} + \frac{L_{LongError}}{t_{Long}} - \frac{L_{ShortError}}{t_{Short}} = C_{Long} - C_{Short} \quad (33)$$

The first two terms taken together equal zero since each term represents the true speed of sound, which is assumed to be the same for both chords. If it is further assumed that the error on the long chord is equal to the error on the short chord then:

$$L_{Error}\left(\frac{1}{t_{Long}} - \frac{1}{t_{Short}}\right) = C_{Long} - C_{Short} \quad (34)$$

And:

$$L_{Error}\left(\frac{t_{Short} - t_{Long}}{t_{Long} t_{Short}}\right) = C_{Long} - C_{Short} \quad (35)$$

Therefore:

$$L_{Error} = \frac{t_{Long} t_{Short}(C_{Long} - C_{Short})}{t_{Short} - t_{Long}} \quad (36)$$

When there are no length errors, the expression on the right of equation (36) evaluates to zero.

A function, $\epsilon$ (epsilon), can be defined to equal the expression on the right of equation (36), such that:

$$\varepsilon = \frac{t_{Long} t_{Short}(C_{Long} - C_{Short})}{t_{Short} - t_{Long}} \quad (37)$$

Different expressions of Epsilon may be derived, with various advantages. For example, since t=L/C, it follows that:

$$\varepsilon = \frac{\frac{L_{Long} L_{Short}}{C_{Long} C_{Short}}(C_{Long} - C_{Short})}{\frac{L_{Short}}{C_{Short}} - \frac{L_{Long}}{C_{Long}}} \quad (38)$$

Which reduces to:

$$\varepsilon = \frac{L_{Long} L_{Short}(C_{Long} - C_{Short})}{C_{Long} L_{Short} - C_{Short} L_{Long}} \quad (39)$$

The advantage to the expression of equation (39) is that Epsilon is calculated based upon distances L and the speed of sound in the fluid. Because at least one value for L is assumed to be known, and speed of sound is a quantity determined by an ultrasonic meter, it is a convenient calculation.

If instead substitution is made for the C values rather than t values in equation (38), Epsilon becomes:

$$\varepsilon = \frac{t_{Long} t_{Short}\left(\frac{L_{Long}}{t_{Long}} - \frac{L_{Short}}{t_{Short}}\right)}{t_{Short} - t_{Long}} \quad (40)$$

Which reduces to:

$$\varepsilon = \frac{t_{Short} L_{Long} - t_{Long} L_{Short}}{t_{Short} - t_{Long}} \quad (41)$$

Since the L values are equal to $L_{True} + L_{Error}$, a substitution can be made:

$$\varepsilon = \frac{t_{Short}(L_{LongTrue} + L_{LongError}) - t_{Long}(L_{ShortTrue} + L_{ShortError})}{t_{Short} - t_{Long}} \quad (42)$$

After rearranging:

$$\varepsilon = \frac{t_{Short} L_{LongTrue} - t_{Long} L_{ShortTrue}}{t_{Short} - t_{Long}} + \frac{t_{Short} L_{LongError} - t_{Long} L_{ShortError}}{t_{Short} - t_{Long}} \quad (43)$$

The first term is equal to zero leaving:

$$\varepsilon = \frac{t_{Short} L_{LongError} - t_{Long} L_{ShortError}}{t_{Short} - t_{Long}} \quad (44)$$

Equation (44) illustrates that the errors on the long and short chords affect Epsilon. The transit time at zero flow is not available with flow present so L/C may be substituted for t, and thus equation (44) becomes:

$$\varepsilon = \frac{\frac{L_{Short}}{C_{Short}} L_{LongError} - \frac{L_{Long}}{C_{Long}} L_{ShortError}}{\frac{L_{Short}}{C_{Short}} - \frac{L_{Long}}{C_{Long}}} \quad (45)$$

And after simplifying:

$$\varepsilon = \frac{C_{Long} L_{Short} L_{LongError} - C_{Short} L_{Long} L_{ShortError}}{C_{Long} L_{Short} - C_{Short} L_{Long}} \quad (46)$$

The advantage of equation (46) is that once Epsilon is measured in the meter, the value for Epsilon may be used and the length error more easily calculated.

The equations for Epsilon and Eta are:

$$\varepsilon = \frac{L_{Long} L_{Short}(C_{Long} - C_{Short})}{C_{Long} L_{Short} - C_{Short} L_{Long}} \quad (47)$$

and $$\eta = \frac{L_{long} L_{short}(C_{Long} - C_{Short})}{C_{Long} C_{Short}(L_{long} - L_{short})} \quad (48)$$

Therefore, Epsilon can be expressed as a function of Eta:

$$\varepsilon = \frac{C_{Long}C_{Short}(L_{Long}L_{Short})}{C_{Long}L_{Short} - C_{Short}L_{Long}}\eta \quad (49)$$

The proportionality of equation (49) looks like the negative of the speed of sound. By letting $C_{Long}$ equal $C_{Short}$, equation (49) reduces to:

$$\varepsilon = -C\eta \quad (50)$$

In a first case, it is assumed that a long chord is measured correctly. To find the length error, $L_{ShortError}$, on the short chord:

$$\varepsilon = \frac{C_{Long}L_{Short}L_{LongError} - C_{Short}L_{Long}L_{ShortError}}{C_{Long}L_{Short} - C_{Short}L_{Long}} \quad (51)$$

Since $L_{LongError}$ equals 0 this reduces to:

$$\varepsilon(C_{Long}L_{Short} - C_{Short}L_{Long}) = -iC_{Short}L_{Long}L_{ShortError} \quad (52)$$

or $$L_{ShortError} = \frac{\varepsilon(C_{Short}L_{Long} - C_{Long}L_{Short})}{C_{Short}L_{Long}} \quad (53)$$

and $$L_{ShortError} = \varepsilon\left(1 - \frac{C_{Long}L_{Short}}{C_{Short}L_{Long}}\right) \quad (54)$$

Therefore, if delay time is correct, then the length error is:

$$L_{ShortNew} = L_{ShortOld} - L_{ShortError} \quad (55)$$

If $L_{Short}$ is correct then, the length error can be converted to a transit time error:

$$te_{Short} = \frac{-L_{ShortError}}{C_{Long}} \quad (56)$$

and the new delay time is:

$$\tau_{ShortNew} = \tau_{ShortOld} + te_{Short} \quad (57)$$

If the distance L of the short chord is known with confidence, the length error on the long chord $L_{LongError}$ is:

$$\varepsilon = \frac{C_{Long}L_{Short}L_{LongError} - C_{Short}L_{Long}L_{ShortError}}{C_{Long}L_{Short} - C_{Short}L_{Long}} \quad (58)$$

Since $L_{ShortError}$ equals 0 this reduces to:

$$\varepsilon(C_{Long}L_{Short} - C_{Short}L_{Long}) = C_{Long}L_{Short}L_{LongError} \quad (59)$$

or $$L_{LongError} = \frac{\varepsilon(C_{Long}L_{Short} - C_{Short}L_{Long})}{C_{Long}L_{Short}} \quad (60)$$

and $$L_{LongError} = \varepsilon\left(1 - \frac{C_{Short}L_{Long}}{C_{Long}L_{Short}}\right) \quad (61)$$

Therefore, if delay time is correct then the length error is:

$$L_{LongNew} = L_{LongOld} - L_{LongError} \quad (62)$$

If $L_{Long}$ is correct then, the length error can be converted to a transit time error:

$$te_{Long} = \frac{-L_{LongError}}{C_{Short}} \quad (63)$$

and the new delay time is:

$$L_{LongNew} = L_{LongOld} + te_{Long} \quad (64)$$

Thus, Eta and Epsilon are equivalent descriptions, and either one could be used to determine transit time or length errors. Consistent with the illustrative methods of FIGS. 6–8, there are a variety of situations where Eta and Epsilon may be used for advantageous purposes.

In accordance with at least some embodiments, Eta may be used to verify measured delay times and distance L for multiple pairs of transducers. In particular, delay times at infinite separation ($\tau_\infty$) for a plurality of transducer pairs may be determined or measured, e.g., in a test cell. Thereafter, all the transducer pairs are installed in a single ultrasonic meter. The delay times at infinite separation ($\tau_\infty$) are entered into a processor associated with the ultrasonic meter, which ultrasonic meter then calculates the delay time using the respective values of L. Alternatively, the delay times may be externally calculated using $\tau_\infty$ and the lengths L, and these delay times entered directly into the meter. Finally, Eta is calculated at a constant or calibration fluid flow rate through the meter to get good mixing without significant turbulence, e.g., 20 to 30 ft/second (ft/s), to verify accuracy of the delay times (block 906). If Eta is substantially equal to zero for any given pair of chords, then the delay time and chord length for the pair of chords have been measured accurately.

In accordance with further embodiments, Eta may be used to adjust delay times for chords where delay times are amiss (and assuming the distance L between each transducer pair is accurately known). In particular, a non-zero value for Eta for a pair of chords in an ultrasonic meter where separation is accurately known is indicative that the delay time at infinite separation ($\tau_\infty$) of at least one of the chords has not been accurately measured. A calibration fluid flow rate is established through the meter, and one of the chords is selected as a reference. Thereafter, the delay time of the other chord is adjusted until the value of Eta is substantially zero. In this illustrative adjusting, the magnitude of Eta may be used to calculate the delay time error, such as using equation (15), reproduced again below for convenience.

$$te_{Short} = \frac{\Delta L \eta}{L_{Long}} \quad (65)$$

In accordance with yet still further embodiments, Epsilon may be used to verify correct distance L between a transducer pair (and assuming $\tau_\infty$ has been accurately determined for each transducer pair). In particular, if the value of Epsilon is non-zero (and given the above), one chord is chosen as the reference. Thereafter, the lengths of the other chords are adjusted until Epsilon calculated as between the reference chord and the chord under test is substantially zero. In this illustrative adjusting step, the magnitude of Epsilon may be used to determine the error in the length measurement.

$$L_{LongError} = \varepsilon \left( 1 - \frac{C_{Short} L_{Long}}{C_{Long} L_{Short}} \right) \quad (66)$$

In accordance with still further embodiments, Eta may be used to verify measured delay times and distance L in multiple ultrasonic meters. In particular, the delay times at infinite separation ($\tau_\infty$) for a plurality of transducer pairs, e.g., four pairs, may be determined, such as in a test cell. Thereafter, the transducer pairs may be installed one each in a plurality of ultrasonic meters. The delay times at infinite separation ($\tau_\infty$) are entered into a processor associated with the ultrasonic meter, which ultrasonic meter then calculates the delay time using the respective values of L. Alternatively, the delay times may be externally calculated using $\tau_\infty$ and the lengths L, and these delay times entered directly into the meter. During calibration flow in each of the plurality of ultrasonic meters, Eta is calculated for each meter as between an existing transducer pair and the transducer pair for which delay time at infinite separation ($\tau_\infty$) has been measured. If Eta is non-zero indicating delay time errors for the existing transducer pair, Eta may be used to adjust the delay time for the transducer pair of the existing chord. Adjusting if necessary may be repeated for each existing transducer pair in each ultrasonic meter.

In accordance with further embodiments, Eta may be used to adjust delay times for transducers in an ultrasonic meter (and assuming the distance L is known for each chord). In particular, the delay time at infinite separation ($\tau_\infty$) for a transducer pair is accurately determined, e.g., in a test cell or in an ultrasonic meter. The transducer pair is then installed in an ultrasonic meter on a chord nearest the temperature measurement in the ultrasonic meter. During calibration flow the delay time for the remaining transducer pairs are adjusted using Eta.

In accordance with yet still further embodiments, Eta may be used to set delay time for one or more pairs of transducers installed after the failure of one or more existing pairs of transducers (and assuming at least one non-failed transducer pair and the distance L for each transducer pair is known). In particular, a defective transducer pair is replaced with a new transducer pair, and the newly installed transducer pair delay time is corrected for the distance L. During calibration flow the non-failed transducer pair is selected as a reference, and Eta is calculated using the reference and for each newly installed transducer pair. For each newly installed transducer pair, the delay times may be adjusted if necessary, using Eta as discussed above.

In accordance with still further embodiments, Eta may be used to set transducer separation for one or more pairs of transducers installed after the failure of one or more existing pairs of transducers (and assuming at least one non-failed transducer pair and that delay times are accurately known). In particular, a defective transducer pair is replaced with a new transducer pair, and the newly installed transducer pair's delay time is entered, including adjusting for difference in distance L between the test cell and the actual ultrasonic meter installation. During calibration flow, the non-failed transducer pair is selected as a reference, and Epsilon is calculated using the reference and for each newly installed transducer pair. For each newly installed transducer pair, the distance L may be adjusted if necessary, using Epsilon as discussed above.

Finally, in accordance with yet still other embodiments, Eta may be used to calculate delay times based on a difference in delay times for two different transducer pairs (and assuming the distance L for each transducer pair is accurately known and different). In particular, a delay time difference is measured for two transducer pairs, and delay time at infinite separation ($\tau_\infty$) is determined. The two transducer pairs are then installed in an ultrasonic meter, one pair of transducers on the short chord and one pair of transducers on the long chord. The delay time estimates for each transducer pair are entered into the processor associated with the ultrasonic meter, and compensation made for difference in distance L for each pair of transducers. During calibration flow the value of Eta will be calculated and the value will be the correction to be applied to both cords, and thereafter all the transducer pairs may have their delay times properly adjusted. These embodiments allow for calculation of delay times without knowing the speed of sound in the fluid. This could be a major advantage where there is a significant error in the speed of sound measurement for the fluid flowing through the meter. Being able to make the determination without knowing the speed of sound in the fluid of the test cell or an actual meter also eliminates the need to measure pressure and temperature and/or to use nitrogen.

The various embodiments of the invention are applicable not only to a four-chord ultrasonic meter but also to other meter designs, such as meters with a different number of chords. The invention also applies to bounce-path ultrasonic meters (so long as those meters have at least two chords of differing lengths). In addition, the use of nomenclature such as $L_A$ and $L_B$ should not be construed to limit the invention to a particular set of chords. The invention may be used with any chords of differing length in an ultrasonic meter.

While various embodiments of this invention have been shown and described, modifications thereof can be made by one skilled in the art without departing from the spirit or teaching of this invention. The embodiments described herein are exemplary only and are not limiting. For example, the embodiments apply equally well to digitized signals as analog signals. Many variations and modifications of the system and apparatus are possible and are within the scope of the invention. For example, the embodiments apply to any ultrasonic data originating from two or more chords having differing lengths and is not limited to the disclosed four chord meter. Accordingly, the scope of protection is not limited to the embodiments described herein, but is only limited by the claims which follow, the scope of which shall include all equivalents of the subject matter of the claims.

What is claimed is:

1. A method comprising:
   measuring a delay time for a first transducer pair;
   measuring a total measured time for ultrasonic signals transmitted between a second transducer pair in an ultrasonic meter in which both the first and second transducer pairs are installed; and
   calculating a parameter associated with the second transducer pair using the delay time of the first transducer pair and the total measured time for said second transducer pair.

2. The method as defined in claim 1 wherein measuring the delay time further comprises determining delay time at infinite separation of first transducer pair.

3. The method as defined in claim 2 wherein calculating further comprises calculating the parameter using delay time at infinite separation of the first transducer pair.

4. The method as defined in claim 1 wherein calculating further comprises calculating a delay time for the second transducer pair.

5. The method as defined in claim 1 wherein calculating further comprises calculating a delay time error of the delay time for the second transducer pair.

6. The method as defined in claim 1 wherein calculating further comprises calculating a distance between the second transducer pair.

7. The method as defined in claim 1 wherein calculating further comprises calculating a distance error between the second transducer pair.

8. The method as defined in claim 1 wherein calculating further comprises calculating the parameter using the delay time of the first transducer pair and a time associated with the second transducer pair at least partially compensated for differences between total measured time and actual transit time.

9. The method as defined in claim 1 wherein measuring the delay time for first transducer pair further comprises measuring the delay time for the first transducer pair with the first transducer pair in a test cell.

10. A method comprising
    measuring a delay time difference between a first pair of transducers and a second pair of transducers;
    measuring a first total measured time for ultrasonic signals transmitted between the first transducer pair in an ultrasonic meter in which both the first and second transducer pairs are installed;
    measuring a second total measured time for ultrasonic signals transmitted between the second transducer pair in the ultrasonic meter; and
    calculating a delay time for the first transducer pair using the delay time difference and the total measured times.

11. The method as defined in claim 10 further comprising calculating a delay time for the second transducer pair using the delay time difference and the total measured times.

12. The method as defined in claim 10 wherein measuring a delay time difference further comprises measuring the delay time difference in a test cell.

13. The method as defined in claim 10 wherein calculating the delay time further comprises calculating the delay time for the first transducer pair using the delay time difference and times at least partially compensated for differences between total measured time and actual transit time.

14. An ultrasonic meter comprising:
    a spool piece which fluidly couples within a conduit carrying fluid flow;
    control electronics associated with the spool piece;
    a first chord through the spool piece, the first chord accepts a first pair of transducers, and the control electronics couple to the first pair of transducers; and
    a second chord through the spool piece, the second chord accepts a second pair of transducers, and the control electronics couple to the second pair of transducers;
    wherein the control electronics accept a value proportional to a delay time for the first pair of transducers, and wherein the control electronics calculate a parameter associated with the second pair of transducers using at least the value proportional to the delay time for the first pair of transducers.

15. The ultrasonic meter as defined in claim 14 wherein the control electronics accept the value proportional to the delay time being the delay time at infinite separation.

16. The ultrasonic meter as defined in claim 14 wherein the control electronics calculate a delay time for the second transducer pair.

17. The ultrasonic meter as defined in claim 14 wherein the control electronics are configured to calculate a delay time error of the delay time for the second transducer pair.

18. The ultrasonic meter as defined in claim 14 wherein the control electronics are configured to calculate a distance between the second transducer pair.

19. The ultrasonic meter as defined in claim 14 wherein the control electronics are configured to calculate a distance error between the second transducer pair.

20. The ultrasonic meter as defined in claim 14 wherein the control electronics are configured to calculate a parameter using the delay time of the first transducer pair and a time associated with the second transducer pair at least partially compensated for differences between total measured time and actual transit time.

* * * * *